United States Patent [19]

Kline et al.

[11] 4,207,682
[45] Jun. 17, 1980

[54] FLUID BED NOZZLE RETAINER

[75] Inventors: Kenneth H. Kline, Catasauqua; Walter W. Kramer, Allentown, both of Pa.

[73] Assignee: Fuller Company, Bethlehem, Pa.

[21] Appl. No.: 892,639

[22] Filed: Apr. 3, 1978

[51] Int. Cl.² ............................................. F26B 13/20
[52] U.S. Cl. ................................... 34/57 A; 34/57 B; 239/559; 432/58
[58] Field of Search .................. 34/57 A, 57 B, 57 R; 432/15, 58; 110/244, 245; 239/559; 23/288 S

[56] References Cited

U.S. PATENT DOCUMENTS

| | | | |
|---|---|---|---|
| 3,495,336 | 2/1970 | Gecewich et al. | 34/57 |
| 3,552,033 | 1/1971 | Steever et al. | 34/57 A |
| 3,672,577 | 10/1970 | Kramer | 34/57 A |
| 3,708,887 | 1/1973 | Erisman | 34/57 A |
| 3,829,983 | 8/1974 | White | 34/57 A |
| 4,068,389 | 1/1978 | Staffin et al. | 34/57 A |

*Primary Examiner*—Larry I. Schwartz
*Attorney, Agent, or Firm*—Frank H. Thomson

[57] ABSTRACT

A wear resistant plate is secured to the surface of a refractory grid of a fluid bed apparatus to both improve the wear life of the refractory grid and to serve as a means for retaining the fluidizing air nozzles in place. Anchor bolts or studs are embedded in the refractory material. These can be either embedded in cast refractory during the casting process or in the case of factory fired refractory bricks, T-shaped grooves are formed in the sides of the bricks. Wear resistant plates are then secured to the surface of the refractory by using the anchor bolts and suitable fasteners. The wear resistant plates have openings therethrough which are aligned with but larger than the fluidizing air holes in the refractory grid. The fluidizing air holes through the grid have nozzles positioned therein. These nozzles are secured to the grid by using a fastener arrangement to releasably secure the nozzles to the wear resistant plate or by shaping the wear resistant plate to act as a fastener.

10 Claims, 8 Drawing Figures

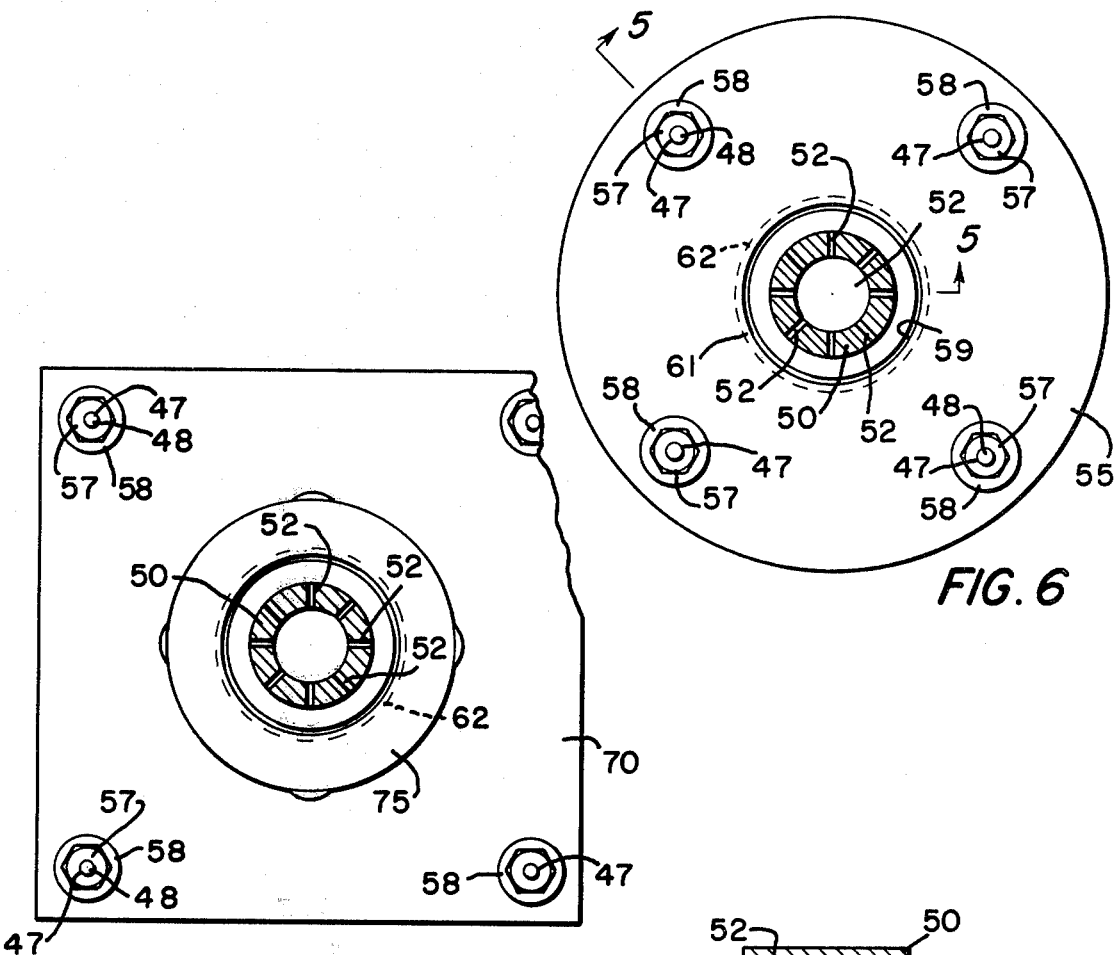
FIG. 6
FIG. 8
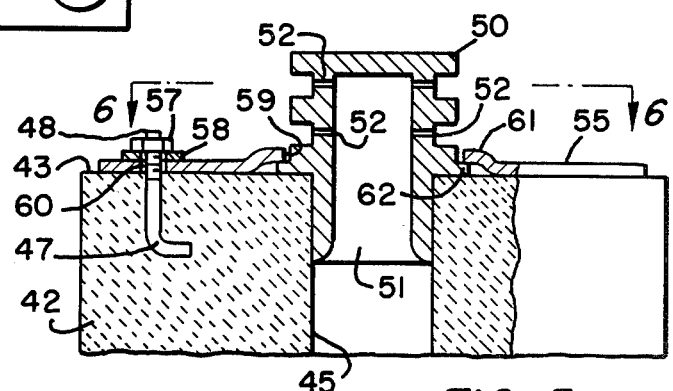
FIG. 5
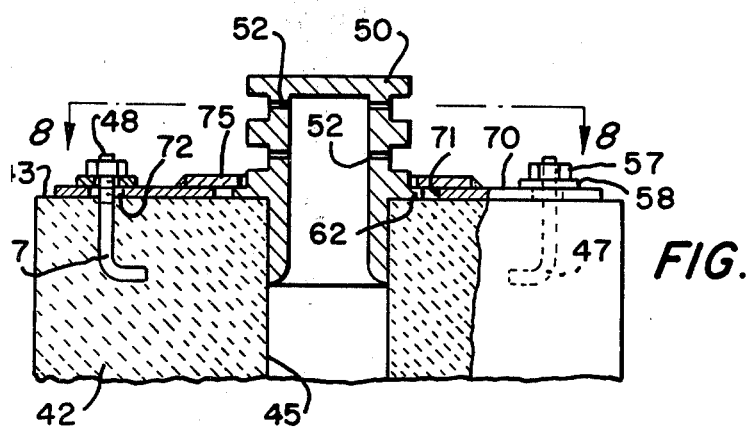
FIG. 7

FLUID BED NOZZLE RETAINER

BACKGROUND OF THE INVENTION

The present invention relates to fluid bed apparatus in general and more particularly to an improved refractory grid and fluidizing air nozzle retainer apparatus.

Prior to the present invention, it was common practice to employ refractory grids in fluid bed apparatus for dividing the vessel into an upper material chamber and a lower plenum chamber. The grid also serves to support the bed of material within the material chamber. Refractory materials are most commonly used where high temperature reactions will take place within the fluidized bed of material. As is customary, the grid includes a plurality of spaced apart holes therethrough to permit fluidizing gas to pass from the lower plenum chamber to the upper material chamber for fluidizing material within the material chamber as well as supplying combustion air to the fluid bed where such is required.

It is common practice to place nozzles in the fluidizing air holes in the refractory grid for dispersing the fluidizing gas throughout the fluidized bed. These nozzles also serve to prevent the solid particulate material which makes up the bed of material from sifting through to the plenum chamber. Various techniques have been used for retaining these nozzles in place. One such technique is to merely place the nozzles in the fluidizing air holes but make the nozzles heavy enough so that gravity will hold them in place and the pressure exerted on them by the fluidizing air will not cause them to be blown out of the air holes into the material chamber. As long as conditions are as designed with steady reactor operation, the nozzles will remain in place. However, if there is a sudden increase in plenum chamber pressure or decrease in material chamber pressure, the weighted nozzle can be blown out of the grid leaving the fluidizing air hole open and permitting the bed to pour down this now open fluidizing air hole into the plenum chamber. It is, of course, undesirable to have the fine material in the plenum chamber because this material can be valuable product which will be lost, or it can be abrasive, swirl around in the plenum and cause wear on the bottom of the grid or the plenum walls, or the fine material can pass up through other nozzles causing excessive wear on these nozzles. Economics is a further disadvantage of making the nozzles heavy to withstand the pressure of air. Fluidizing nozzles for high temperature fluid bed apparatus are usually made from costly corrosion and temperature resistant materials. The heavier the nozzle, the more costly it is to produce.

Other methods are used for retaining nozzles in place. These include the use of enlarged holes and tapered nozzles as shown in U.S. Pat. No. 3,672,577. Rods have been attached to nozzles to extend down through the fluidizing air holes with fasteners for securing this rod to the underside of the grid and thus secure the nozzle to the grid. The first arrangement has the disadvantage that the nozzles and grid can be more expensive than other methods. The second arrangement is troublesome where the bottom of the refractory is subjected to wear caused by fine abrasive material which may enter the plenum chamber. In addition, thermal expansion causes problems when a tie rod arrangement is used. When the tie rods become hot, they expand. As a result the fasteners move away from the under surface of the grid and the nozzles are no longer held firmly in place.

Typical refractory grids for fluid bed apparatus are subject to wear problems. The constant swirling motion of the particles which make up the fluid bed abrade the surface of the grid. The abrasion is compounded since many fluidizing air nozzles direct the fluidizing air flow downwardly toward the grid surface in order to improve the circulation of air and material through the bed. As a result, the abrasive material wears away the surface of the grid. After a period of operation this wear can become so severe that the grid must be replaced. It is therefore important to improve refractory grid life.

By the present invention, apparatus has been found which will serve to not only improve the wear life of a refractory grid, but also serve to provide a means for holding fluidizing air nozzles in place.

SUMMARY

It is therefore the principal object of this invention to provide a refractory grid for a fluid bed apparatus which has improved wear life when compared with prior refractory grids.

It is a further object of this invention to provide an improved apparatus for holding fluidizing gas nozzles in place in the refractory grid of a fluidized bed apparatus to thereby improve the wear life of the apparatus.

It is a still further object of this invention to provide a novel arrangement for securing a wear resistant plate to the surface of refractory blocks used to make up a refractory grid and to the refractory grid as a whole.

It is still another object of this invention to provide a wear resistant plate which can be attached to the surface of refractory blocks used to make up the refractory grid of a fluid bed reactor and these wear resistant plates can be used to secure fluidizing air nozzles in place.

In general, the foregoing and other objects of this invention will be carried out by providing in a fluidized bed apparatus, a gas permeable grid for dividing the fluidized bed apparatus into a lower plenum chamber and an upper material chamber comprising a plurality of refractory blocks joined together to form the refractory grid; said refractory grid having a plurality of openings therethrough adapted to permit the passage of fluidizing gas from the lower plenum chamber to the upper material chamber of the fluidized bed apparatus, each of said refractory blocks having at least one anchor bolt embedded therein and having one end extending above one surface of the block, a plurality of wear resistant plates each adapted to lie atop said one surface of each block and having a first opening therein aligned with one of the openings through the refractory grid and at least one second opening therethrough positioned to receive said one end of said anchor bolt, and fastener means for engaging said one end of said anchor bolt of securing said wear resistant plate to said one surface of the block. The opening in the wear resistant plate has a diameter larger than the diameter of the openings through the refractory grid, and means are operatively associated with the wear resistant plate and the nozzle means for securing the nozzle means to the refractory grid.

BRIEF DESCRIPTION OF THE DRAWINGS

The invention will be described in connection with the annexed drawings wherein:

FIG. 5 is a sectional view taken on the line 5—5 of FIG. 6 showing a fluidizing gas nozzle held in place in the refractory grid in accordance with the present invention;

FIG. 6 is a view partly in section taken on the line 6—6 of FIG. 5;

FIG. 7 is a view similar to FIG. 5 showing a modified arrangement for securing a fluidizing gas nozzle in place in a refractory grid; and FIG. 8 is a view partly in section taken on the line 8—8 of FIG. 7.

DESCRIPTION OF THE PREFERRED EMBODIMENTS

Figure 1:
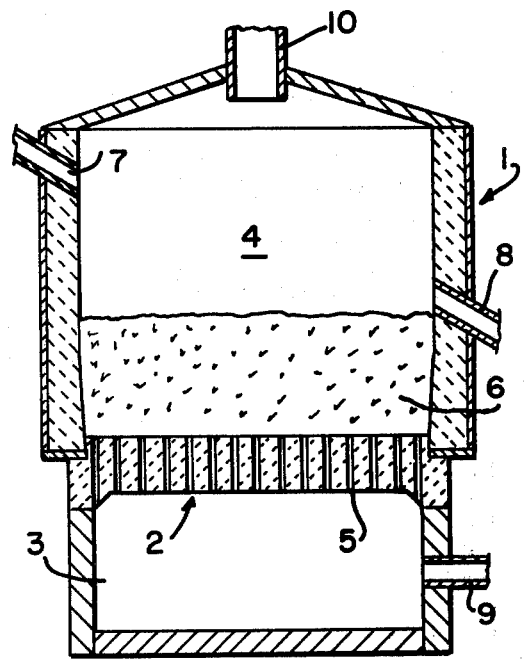
FIG. 1 is a diagrammatic view of a fluid bed apparatus.

The present invention is particularly directed to a means for retaining nozzles in a fluid bed grid. A typical fluid bed apparatus is shown in FIG. 1 and includes a vessel 1 having a gas permeable grid 2 mounted therein dividing the vessel 1 into a lower plenum chamber 3 and an upper material chamber 4. The grid has a plurality of holes 5 therethrough permitting communication between chambers 3 and 4. Solid particulate material is supplied to the material chamber through a material inlet 7 to form a bed of material 6 which is supported by the grid 2. Processed material is discharged from the bed 6 by overflow through outlet 8. Fluidizing air is supplied to the plenum chamber 3 through gas inlet 9 from a suitable source (not shown). The fluidizing gas passes up through the holes 5 through grid 2 to fluidize the bed of material 5. Spent fluidizing air is exhausted from the material chamber 4 through outlet 10. Nozzles are conventionally positioned in holes 5 and extend into the material chamber 4 in order to assist in the dispersal of fluidizing air through the bed of material 6 and prevent the solid particulate material from sifting through the grid 2 into chamber 3.

Figure 2:
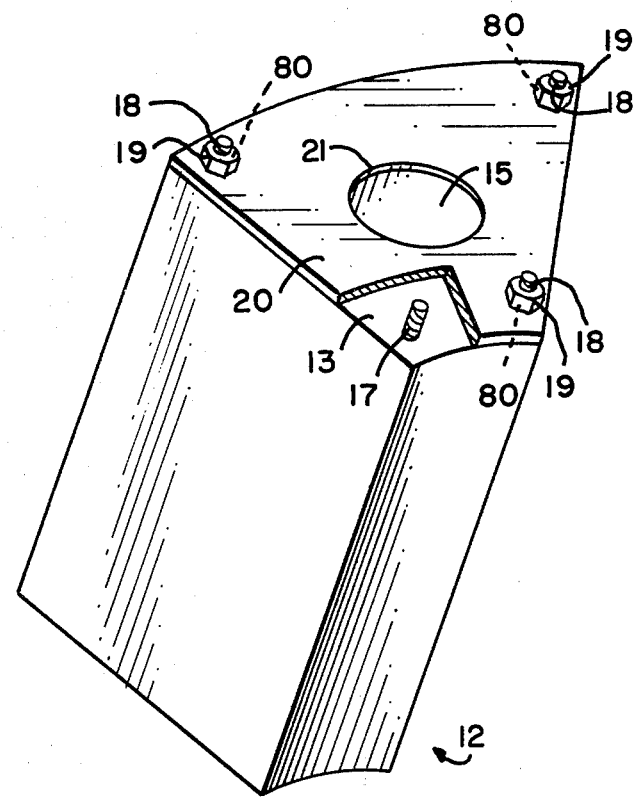
FIG. 2 is a perspective view of a refractory block used to make up a refractory grid of a fluid bed apparatus with a wear resistant plate secured thereto.
Figure 3:
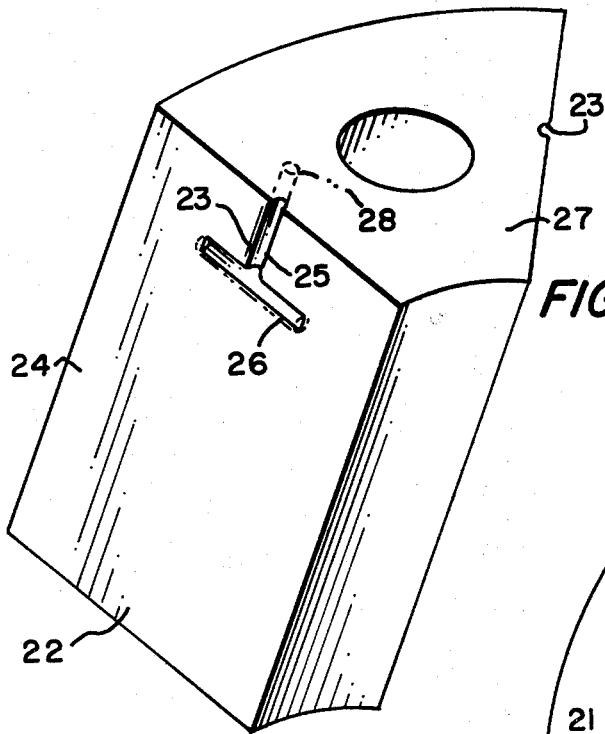
FIG. 3 is a perspective view of another refractory block illustrating an alternate means for securing a wear resistant plate to the block.

If high temperature reactions are to be carried out in the material chamber, the gas permeable grid is usually made from refractory material. This can be either factory fired cast bricks or blocks which are cemented together to form the grid or cast in place refractory blocks which are then cemented together to form the grid. Such refractory blocks are illustrated in FIGS. 2 and 3. A typical fluid bed apparatus which is used for carrying out high temperature reactions will include some means (not shown) for supplying fuel to the bed 6 for combustion within the bed.

In FIG. 2 there is illustrated a cast refractory brick or block generally designated at 12 used to form a refractory grid. This block may be formed in the field by mixing a cement like material and pouring it into forms. The formed block 12 has an opening 15 therethrough which will form the openings 5 through the completed grid. A plurality of blocks 12 are cemented together to form the grid 2. The holes 15 have been shown enlarged relative to the size of the block 12 for clarity purposes. Although block 12 has been shown with a single hole 15, it should be understood that each block 12 may contain several passages therethrough.

A plurality of studs or anchor bolts 17 each having a threaded end 18 are embedded within the block 12 during the casting process while the mix is still soft. One end 18 of bolt 17 extends above the surface 13 of the block 12. Once the cast block has hardened, the anchor bolts 17 are held firmly in place. Although four anchor bolts 17 have been illustrated, it should be understood that a greater or lesser number may be sufficient and are contemplated by the present invention.

Wear resistant plates 20 having at least one first opening 21 therethrough aligned with the opening 15 in the block are placed over the surface 13 of block 12. The plate 20 also includes a plurality of second openings 80 aligned with studs 17 so that the plates 20 can lie atop the surface 13 of blocks 12.

Once the wear plate 20 is in place, fastener means 19 such as nuts engage the end 18 of the anchor bolts 17 for securing the wear resistant plate to the surface 13 of block 12. In FIG. 2, the plate 20 is illustrated as being the same size and shape as the block, but it is to be understood that a single wear resistant plate could cover several joined blocks or even the entire grid. Also, it may be desirable to have the wear resistant plate 20 merely surround the opening 15 rather than cover the entire block 12. The wear resistant plates are preferably made of a high temperature, highly abrasion resistant material such as stainless steel so that the abrasive solid particulate material which makes up the fluid bed and is in constant motion will not wear away the surface of the grid.

Figure 4:
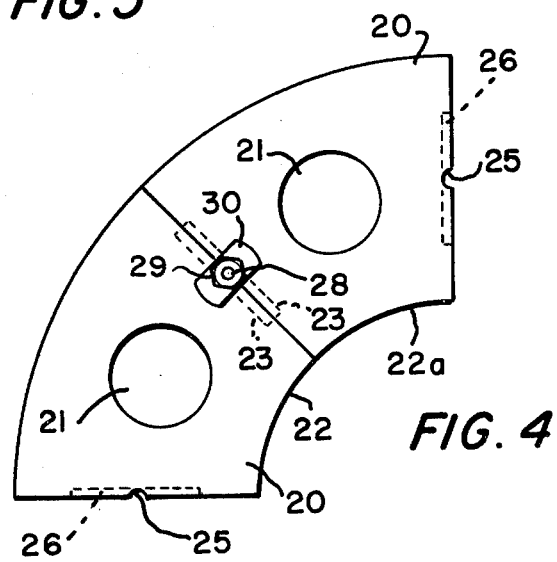
FIG. 4 is a plan view of two of the blocks of FIG. 3 joined together thereby forming a portion of a refractory grid of a fluid bed apparatus.

Referring to FIGS. 3 and 4, there is shown a factory fired refractory brick or block 22 having a fluidizing air passage therethrough. Factory fired bricks are normally formed by pouring a paste mixture of material into a form, and after hardening, the bricks are kiln fired in order to cure the brick. The kiln firing is done at a temperature which would severely damage or destroy an anchor bolt embedded in the manner of a cast brick described in connection with FIG. 2. In order to provide for the addition of an anchor bolt, an inverted T-shaped groove 23 is formed in opposite sides 24 of each brick 22. This T-shaped groove 23 includes a leg groove 25 and cross groove 26 and is positioned so that the leg 25 extends to the top surface 27 of the brick 22. A T-shaped anchor bolt 28 is positioned in groove 23 so that the leg of the bolt 28 has a sufficient length to extend beyond the surface 27 of the block 22 which is at an angle to the side 24 of the block in which the T-shaped groove 23 is located. The grooves 23 are half round so that when two blocks are placed together, as shown in FIG. 4, and cemented in place, the T-shaped grooves of adjacent blocks surround and hold a bolt 28 between the adjacent blocks, half in one block 22 and half in the adjacent block 22a. Since the leg of the bolt 28 extends above the surface 27, a wear resistant plate similar to plate 20 in FIG. 2 then can be bolted to surface 27. As with FIG. 2, the plate 20 has a first opening adapted to be aligned with the fluidizing air passage and a plurality of second openings for receiving bolts 28. Two wear resistant plates may abut against each other at the junction of two blocks 22 and 22a. In this case, a plate 30 can be placed over bolt 28 and secured with fastener or nut 29 so that both plates 20 will be held in place. As with block 12, the block 22 has a passage 15 therethrough to permit fluidizing air to pass through the completed grid. In the embodiment illustrated in FIGS. 3 and 4, it may be advisable to have one wear resistant plate cover the surface 27 of several blocks 22.

In FIGS. 5 to 7, the main purpose of the embedded anchor bolts and wear resistant plates 20 is illustrated. Referring initially to FIGS. 5 and 6, a portion of a gas permeable grid for a fluidized bed apparatus is designated at 42 and includes a top surface 43 which faces the material chamber of the fluid bed vessel and a fluidizing gas passage 45 therethrough. Anchor bolts 47 are embedded in the refractory in the manner of either FIG. 2 or the manner of FIGS. 3 and 4 so that one end 48 extends above the surface 43. A fluidizing gas nozzle 50 which can be considered part of the grid 42 extends into the passage 45 and above the surface 43 so that it will be within the material chamber to the fluid bed vessel. This nozzle 50 includes a longitudinal passage 51 open at one end to passage 45 and closed at its other end. Radial passages 52 extend from the passage 51 through the walls of the nozzle 50 to thereby provide communication between the lower plenum chamber and the upper material chamber through the passages 45 in grid 42 and passages 51 and 52 in nozzle 50. The passages 52 serve to disperse fluidizing gas throughout the bed of material.

Wear resistant plates 55 similar to plates 20 are secured to the surface 43 of the grid 42 by the use of the anchor bolts 47 and fastener means 57 in the form of nuts which engage the one end 48 of anchors 47. Washers 58 may be interposed between nuts 57 and the plates 55.

The plates 55 include at least one enlarged first opening 59 therethrough which is larger than but coaxially aligned with the passage 45 through the grid. A plurality of second holes 60 in the plate 55 permits the plate 55 to be placed over studs 47. The plate 55 is shaped at 61 around hole 59 so that it is raised to lie atop an annular flange 62 on the nozzle 50. When the plate 55 is secured to the surface 43 of the grid 42, the formed portion 61 engages flange 62 to secure the nozzle 50 in the gas passage 45. Fluidizing air under pressure passing through grid 42 will tend to force nozzles 50 out of passages 45 but the nozzles are securely held in place by anchors 47 and plate 55.

Referring to FIGS. 7 and 8 where similar numerals are used to designate like parts of FIGS. 5 and 6, a wear resistant plate 70 has a large central opening 71 therethrough and a plurality of second openings 72 which permit the plate 70 to be mounted on anchor bolts 47 and nuts 57. In the embodiment of FIGS. 7 and 8, rather than shaping the plate, a second annular wear resistant plate 75 surrounds openings 71 and is secured to plate 70 as by welding. The washer 75 engages flange 62 on nozzle 50 to secure the nozzle 50 in passage 45 when plate 70 is secured to grid surface 43.

In both FIGS. 5 and 7, the nozzle is first placed in passage 45, then the wear resistant plate 55 or 70 is placed over studs 47. Nuts 57 then secure the wear resistant plate and nozzles are held in place. It should be understood that the openings in the plates 20, 55 and 70 and washer 75 should be large enough to permit variations in thermal expansion rates between the gas permeable grid, and the plates and between the plates and the nozzles 50.

From the foregoing it should be apparent that the objects of this invention have been carried out. Apparatus has been provided which permits a fluidizing gas nozzle to be securely held in place. The nozzles can be made of lighter material than with prior designs because of the mechanical arrangement for holding them in place. Wear resistant plates can be attached to the surface of a fluid bed apparatus grid to improve wear life of the grid, because the abrasive particles move against wear resistant plates rather than the surface of the grid. If the wear resistant plates become worn after a period of operation, they can easily be replaced without requiring replacement of the entire refractory grid. Although the plates have been illustrated as covering a large area of the grid or refractory block, it should be understood that if the main purpose is to hold the nozzles in place the plates can cover only the area surrounding the fluidizing air passage.

It is intended that the foregoing be merely a description of illustrative embodiments. The invention is to be limited solely by that which is within the scope of the appended claims.

We claim:

1. For use in forming a refractory grid for a fluidized solids vessel, a refractory block having an opening therethrough adapted to permit the passage of fluidizing gas from a lower plenum chamber to an upper material chamber of a fluidized solids vessel comprising at least one anchor bolt embedded within the refractory block and having one end extending above one surface of the block, a wear resistant plate adapted to lie atop said one surface of the block and having a first opening therethrough aligned with the opening through the refractory block and at least one second opening therethrough positioned to receive said one end of said anchor bolt, and fastener means operatively associated with said one end of said anchor bolt for securing said wear resistant plate to said one surface of the block.

2. In a fluidized bed apparatus, a gas permeable grid for dividing the fluidized bed apparatus into a lower plenum chamber and an upper material chamber comprising a plurality of refractory blocks joined together to form the refractory grid; said refractory grid having a plurality of openings therethrough adapted to permit the passage of fluidizing gas from the lower plenum chamber to the upper material chamber of the fluidized bed apparatus, each of said refractory blocks having at least one anchor bolt embedded therein and having one end extending above one surface of the block, a plurality of wear resistant plates each adapted to lie atop said one surface of each block and having a first opening therein aligned with one of the openings through the refractory grid and at least one second opening therethrough positioned to receive said one end of said anchor bolt, and fastener means for engaging said one end of said anchor bolt of securing said wear resistant plate to said one surface of the block.

3. In a fluidized bed apparatus, a gas permeable grid according to claim 2 wherein said first opening in said wear resistant plate has a diameter larger than the diameter of the openings through said refractory grid and further including nozzle means extending into each of said openings through the refractory grid; and means are operatively associated with said wear resistant plate and said nozzle means for securing said nozzle means to the refractory grid.

4. In a fluidized bed apparatus a gas permeable grid according to claim 3 wherein each of said wear resistant plates is shaped adjacent said first opening for engaging said nozzle means to thereby define the means for securing said nozzle means to the refractory grid.

5. In a fluidized bed apparatus, a gas permeable grid according to claim 3 wherein said means for securing said nozzle means to the refractory grid includes a plurality of washer means, each having an opening therethrough coaxial with the first opening through the wear resistant plate and adapted to lie atop and be secured to said wear resistant plate whereby a portion of said nozzle means is secured between said washer means and said refractory grid.

6. A refractory grid for a fluidized bed apparatus having a plurality of holes therethrough for permitting the passage of fluidizing gas between a plenum chamber and a material chamber of the fluidized bed apparatus including a plurality of anchor bolts each embedded in and extending above the surface of the refractory grid, wear resistant plate means adapted to lie atop the surface of the refractory grid and having a plurality of first openings therethrough aligned with the holes through the refractory grid and a plurality of second openings for receiving the ends of the anchor bolts which extend above the surface of the refractory grid, and fastener means for engaging said end of the anchor bolts for securing said wear resistant plate means to the surface of the refractory grid.

7. A refractory grid according to claim 6 further comprising a plurality of nozzle means, each positioned in one of the holes through the refractory grid and means operatively associated with said wear resistant plate means for securing said nozzles to said refractory grid.

8. A refractory grid according to claim 7 wherein each of said nozzle means includes an annular flange and said means for securing said nozzles to said refractory grid is defined by said plate means being shaped to engage said annular flange.

9. A refractory grid according to claim 7 wherein each of said nozzle means includes an annular flange and said means for securing said nozzles to said refractory grid includes washer means adapted to lie atop and be secured to said wear resistant plate means for engaging said annular flange.

10. A refractory grid according to claim 7 wherein said refractory grid includes a plurality of joined together refractory blocks, each having at least one T-shaped groove formed in opposite sides thereof; a plurality of T-shaped bolts; each T-shaped groove in each refractory block being positioned to be aligned with a T-shaped groove in the adjacent block to surround and hold a T-shaped bolt between adjacent blocks to thereby define the embedded anchor bolts.

* * * * *